Sept. 5, 1967   S. NEAL ET AL   3,340,014
STOICHIOMETRIC INDICATOR FOR COMBUSTION OF GAS
Filed July 31, 1964
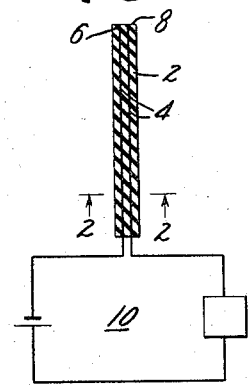
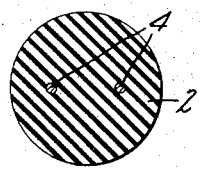
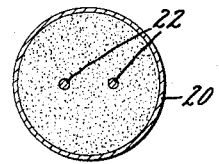
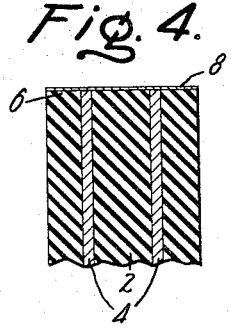
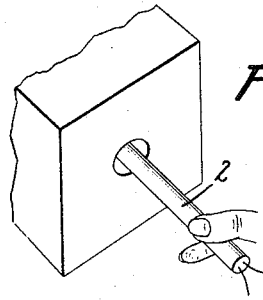
Inventors:
Stanford Neal,
Lee H. Tomlinson,
by Paul A. Frank
Their Attorney.

3,340,014
STOICHIOMETRIC INDICATOR FOR
COMBUSTION OF GAS
Stanford Neal and Lee H. Tomlinson, Schenectady, N.Y., assignors to General Electric Company, a corporation of New York
Filed July 31, 1964, Ser. No. 386,566
5 Claims. (Cl. 23—254)

Our invention relates to indicators and, more particularly, to an indicator for determining the stoichiometric point in a combustion gas mixture.

During the operation of equipment where a combustion reaction is in progress, it is most advantageous to know when the stoichiometric point of the reaction is reached. The stoichiometric point is the point at which the chemical reaction has gone to completion; the elements, oxygen and fuel, have combined without any excess of either remaining unreacted. This point indicates a valuable reference point in the operation of the combustion process.

Presently, complicated and expensive instruments are available for obtaining this information. These instruments are quite fragile and require extreme sensitivity in handling. Other instruments must operate outside the combustion area and reading them, therefore, is unduly influenced by conditions without the combustion area. Still other instruments require placement of the entire measuring apparatus within the combustion area, thus, requiring the measuring instrument to be preplaced within the combustion area, before the reaction commences. These instruments must be placed within the area before the reaction has started and cannot be removed therefrom until long after the reaction is completed, thus rendering it difficult to immediately reuse the measuring instrument.

Our invention envisions a stoichiometric indicator which renders a quick and simple reading when placed within the combustion area, held there for a sufficient time to obtain a reading and then removed therefrom as desired.

The chief object of our invention is the provision of a stoichiometric indicator which can be readily placed into a combustion area and removed therefrom at will after a reading has been obtained.

Another object of our invention is the provision of a stoichiometric indicator having electrical indicating means in conjunction therewith for an instantaneous indication when the stoichiometric point is reached.

Another object of our invention is the provision of a stoichiometric indicator where the electrical system is not exposed to the combustion atmosphere, during its operation.

Another object of our invention is the provision of a stoichiometric indicator which triggers a subsequent process when the indicator so indicates the stoichiometric point of a reaction.

A further object of our invention is the provision of an indicator that changes in color to indicate when the stoichiometric point is reached.

These and other objects of our invention will be more readily perceived from the description which follows.

One of the features of our invention is a highly efficient stoichiometric indicator that is held from a point outside the combustion area while obtaining a reading partially inserted within the combustion area.

The drawings illustrate a preferred embodiment of our invention in which:

FIGURE 1 is a view of the apparatus of our invention.

FIGURE 2 is an enlarged cross-sectional view of the device of FIGURE 1 taken along line 2—2.

FIGURE 3 is an enlarged cross-sectional view of a modification of the device of our invention.

FIGURE 4 is an enlarged cross-sectional view of our invention taken along line 4—4.

FIGURE 5 is a perspective view of the device of FIGURE 1.

In FIGURE 1, there is shown a view of the stoichiometric indicator embodying our invention. The construction includes ceramic probe tube 2 of a uniform diameter, having at one tip 6 a copper oxide film 8 fused to, or otherwise permanently secured to tube 2. This thin film partially combines with the ceramic to form a glaze like coating. This tip indicates when the stoichiometric point is reached by changing from an oxide to the metal or vice versa, as will subsequently be described. Positioned within tube 2 and parallel to the axis thereof, are lead wires 4 for transmitting the reaction of tip 8 to indicating circuit 10. Leads 4 are securely fastened to tip 8 to complete the electrical connection between them and the remainder of the electrical circuit. These leads are so positioned within tube 2 to prevent the furnace atmosphere from adversely affecting them. Indicating circuit 10, to which leads 4 connect, consists of a source of energy 12 for supplying current to the circuit, and an indicator 14 to portray the response of tip 8. Indicator 14 as illustrated in FIGURE 1 consists of a lamp which lights in response to the reaction of tip 8. Alternatively, the lamp may be replaced by other indicating devices e.g., a bell or by an electrical relay to transmit the indication to mechanisms in a related circuit. The reaction of tip 8 is then immediately indicated by the attached electrical circuit without having the electrical system exposed to the furnace atmosphere.

In operation, tip 8 as shown in FIGURE 4 which is coated with a copper oxide film remains in this copper oxide state in an oxidizing atmosphere, i.e., an atmosphere with excess oxygen present, whereas, in a reducing atmosphere, i.e., one rich in fuel but deficient in oxygen, the tip goes to its metallic state, i.e., copper. The electrical resistance of an oxide is far greater than the resistance of the metal, e.g., the copper oxide film is about 100 times more resistive than the pure copper film. This increased resistance of the metal oxide in the electrical circuit is sufficiently great to prevent enough current from reaching the indicating device to cause it to operate. On the other hand, when tip 8 is in the pure metallic state, the resistance offered to the circuit is very slight and the light or other indicating device correspondingly responds. This change from the oxide to the metal or vice versa is instantaneous when the stoichiometric point is reached. When a fuel rich atmosphere prevails, the metal oxide will quickly change into the pure metallic state, or if it is already in that state it will remain there. Alternatively, when a lean or oxidizing atmosphere prevails the reverse is true. Thus, this instrument will quickly indicate when the stoichiometric point has been reached, and in which atmosphere operation is proceeding.

Ceramic tube 2 as shown in FIGURE 1 is an electrical nonconductor, and thermal insulator, in order to prevent the heat surrounding tip 8, when it is inserted into a furnace, from affecting the holder at the other end of the indicator. This permits the indicator to be quickly inserted into the combustion area as shown in FIGURE 5, held there sufficiently long to obtain a reading and then withdrawn without the need for either leaving the device within the area permanently or requiring expensive extra equipment to hold the indicator during measuring. This insulating effect permits rapid reading of the device and reuse of it immediately without the necessity of waiting for the entire combustion process to terminate. Ceramic tube 2 may be formed in the conventional way and have two holes formed therein for the insertion of wire leads 4 as illustrated in FIGURE 2. Alternatively, as illustrated in FIGURE 3, ceramic tube 2 may be made by a swaging process. This consists of filling metal cylinder 20 with a powdered ceramic mixture, inserting leads 22 therein and then rolling tube 20 to decrease its diameter, thereby compressing the ceramic particles together into a solid ceramic rod with wire leads embedded therein. Metal cylinder 20 is separated from tip 8 so as not to interfere electrically with the operation of the indicating circuit. This cylinder also serves as an effective thermal conductor, to cool tip 8 of the probe.

It is also noted that tip 8 is coated with other reversible nonvolatile metal oxides, e.g., nickel oxide, lead oxide, etc., or a combination of these. These compositions change rapidly from oxide to pure metal at the stoichiometric point and vice versa, reversibly, without changing from the solid form during the reversing process.

It also may be appreciated that rod 2 may be simply coated with a copper oxide tip without any electrical circuit involved. The tip will change color from the bright shiny metal to the dull oxide finish as aforementioned, thereby providing visible means for determining the stoichiometric point.

It is now apparent that the invention attains the objective set forth. Apparatus embodying the invention is sturdy in construction and well adapted for use in conjunction with combustion environments. Ease of placement and extraction of the measuring device in the combustion area is provided with the utmost simplicity and ease of operation.

Specific embodiments of our invention have been illustrated, but my invention is not limited thereto, since many modifications may be made by one skilled in the art, and the appended claims are intended to cover all such modifications as fall within the true spirit and scope of the invention.

What we claim as new and desire to secure by Letters Patent of the United States:

1. A gas mixture indicating device comprising an elongated probe of nonconducting material, and a thin coating of a metal oxide attached to one end of said probe which metal oxide is readily reducible to the metallic state in response to a change in the proportion of the components of the gas mixture.

2. A gas mixture indicating device as in claim 1 wherein said metal oxide is selected from an oxide of a metal of the group consisting of copper, lead and nickel, and combinations thereof.

3. A gas mixture indicating device comprising an elongated cylinder of nonconducting ceramic material,
a thin coating of a metal oxide secured to one end of said cylinder which metal oxide is readily changed from the oxide to the metallic state and vice versa in response to changes in the proportion of the components of the gas mixture to go from an oxidizing to a reducing atmosphere and vice versa, said oxide and metal remaining as a coating in the solid form,
electrical leads extending from opposite sides of said thin coating and forming an electrical circuit with a voltage source and an electrical indicator whereby the resistance changes of said thin coating can be determined to indicate the changes in proportion of the gas mixture.

4. A stoichiometric indicator comprising
a hollow metal tube,
a compressed ceramic filler within said tube,
a thin coating of a metal oxide fused to one end of said filler which metal oxide is readily reduced from the oxide to the metallic state and vice versa in response to changes in the proportion of the components of the gas mixture which changes pass over the stoichiometric point, said oxide and metal remaining as a coating in the solid form,
electrical leads extending from opposite sides of said thin coating and forming an electrical circuit with a voltage source and an electrical indicator whereby the resistance changes of said thin coating can be determined to indicate the changes in proportion of the gas mixture.

5. A gas mixture indicating device comprising
an elongated cylinder of nonconducting ceramic material,
a thin coating of a nonvolatile metal oxide fused to one end of said cylinder which metal oxide is readily reduced from the oxide to the metallic state and vice versa in response to changes in the proportion of the components of the gas mixture to go from an oxidizing to a reducing atmosphere and vice versa, said oxide and metal remaining as a coating in the solid form,
electrical leads extending from opposite sides of said thin coating and forming an electrical circuit wtih a voltage source and an electrical indicator whereby the state of said thin coating and the extent of oxidizing or reducing material in the gas mixture is indicated on said electrical indicator.

References Cited
UNITED STATES PATENTS

| | | | |
|---|---|---|---|
| 3,051,895 | 8/1962 | Carson | 324—71 |
| 3,119,670 | 1/1964 | Mitchell et al. | 23—254 X |

MORRIS O. WOLK, *Primary Examiner.*

LEUNG MEI, *Assistant Examiner.*